J. C. MORSE.
DROP NET.
APPLICATION FILED OCT. 12, 1914.
1,152,038.
Patented Aug. 31, 1915.
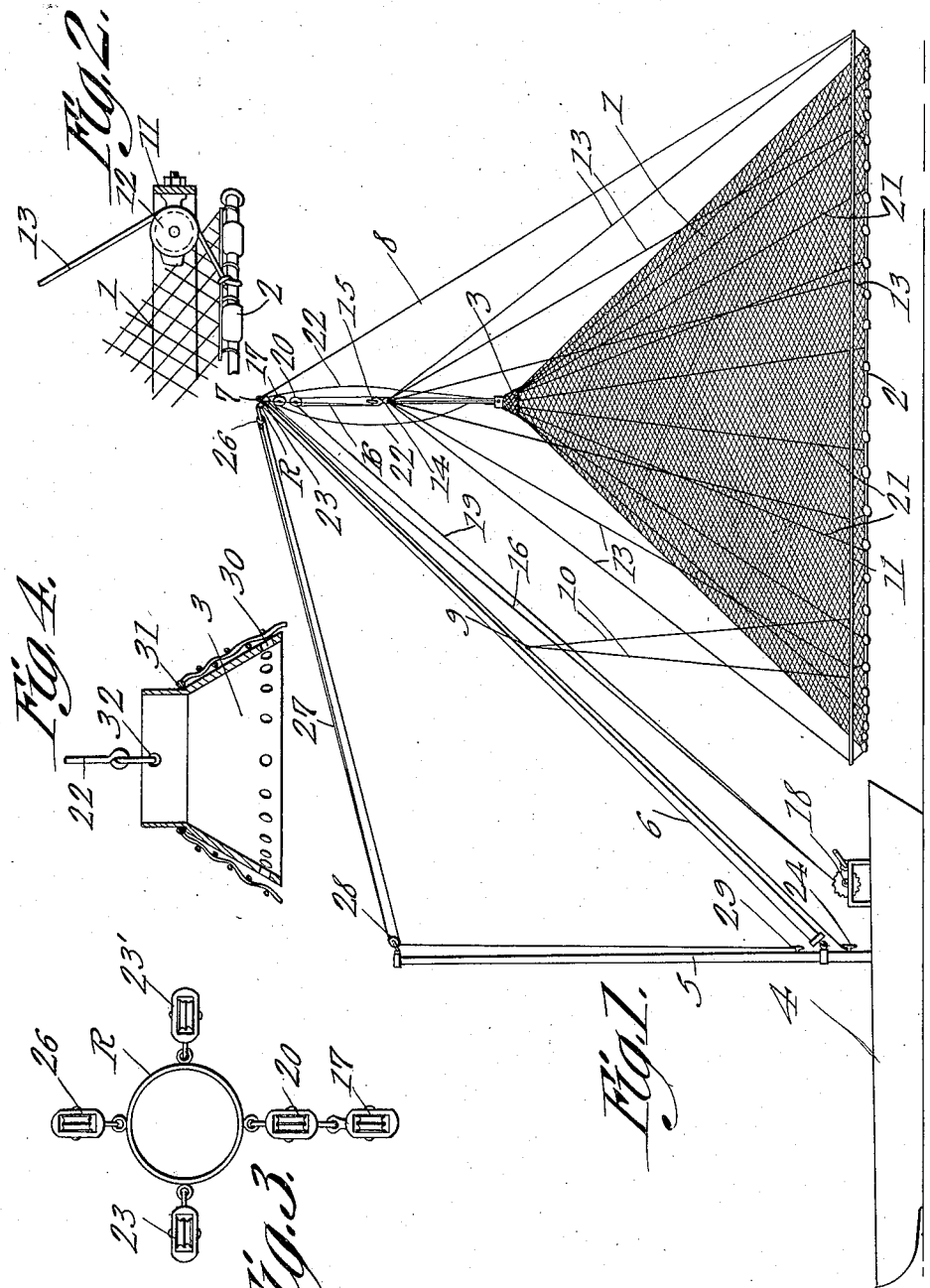
Witnesses
J. R. Tomlin
M. E. McCarthy
J. C. Morse, Inventor
by C. A. Snow & Co.
Attorneys

UNITED STATES PATENT OFFICE.

JOSEPH C. MORSE, OF LITTLE RIVER, SOUTH CAROLINA.

DROP-NET.

1,152,038.      Specification of Letters Patent.      Patented Aug. 31, 1915.

Application filed October 12, 1914. Serial No. 866,348.

*To all whom it may concern:*

Be it known that I, JOSEPH C. MORSE, a citizen of the United States, residing at Little River, in the county of Horry and State of South Carolina, have invented a new and useful Drop-Net, of which the following is a specification.

The present invention relates to improvements in drop nets, one object of the invention, being the provision of a net of this character, adapted to be supported from a mast and boom of a boat, and having means for assisting in holding the lead line in spread relation during the lowering of the net and at the same time such means constituting a guide to assist in the extending and ballooning or collapsing of the net.

A still further object of the present invention, is the provision of a net of this character, which is simple and inexpensive in construction and which is durable, practical and easily operated.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings, Figure 1 is a side elevation of the complete net in the position it assumes just previous to lowering. Fig. 2 is an enlarged detail view showing the lead line of the net and the connection thereof to the ring. Fig. 3 is a top plan view of the pulley arrangement for supporting the various rope and tackle for operating the present net. Fig. 4 is a sectional view through the net carrying horn or member.

Referring to the drawings, the numeral 1 designates the net, which is provided with the lead line 2, the upper end being connected to the frusto-conical tubular member or horn 3 by engaging the ledge 31 thereof, as clearly illustrated in Fig. 4 wherein the net is knit thereupon and held against downward movement, the openings 30 being provided to attach the net thereto to prevent the upward sliding of the same.

The present net is usually applied in position upon a boat 4, which carries the mast 5 to which is swingingly connected the boom 6. This boom 6 has disposed upon the upper end thereof, the ring R, the detail of which is clearly shown in Fig. 3.

Attached to the extreme outer end of the boom 6 is an eye bolt 7 to which is connected the supporting cable 8 for the ring 11, two other cables 10 being attached at 9 to the boom 6 intermediate of the ends of the boom. Thus the ring 11 which is of slightly greater diameter than the lead line 2 is adapted to be supported in a substantially horizontal plane from the boom 6.

The draw lines 13 are attached at their lower ends to the lead line 2 of the net 1 being passed through the pulleys 12 which are attached fixedly to the inner side of the ring 11, the upper ends of said draw lines 13 being connected at 14 so that a single cable 16 connected thereto and passing through the pulleys 15 and 17 and operable by the winch or falling drum 18 upon the boat 4 may be operated to extend the net in the position as shown in Fig. 1 or to be released to permit of the collapse of the lead line as will presently appear. A cable 19 is also attached to be operated from the winch in an opposite direction to the cable 16, said cable 19 being passed over the pulley 20 and connected to a plurality of tuck lines 21, which pass through the horn or frusto-conical member 3 mounted upon the inside of the net 1, their lower ends being connected to the lead line 2 thereof. Thus by drawing upon the cable 19, the lead line is pulled upwardly toward the center to produce the desired balloon effect in collapsing the net in catching fish.

Attached to the openings 32 at diametrically opposite sides of the member 3 are two trip lines 22, said trip lines being extended upwardly and through the pulleys 23 of the ring R downwardly along the boom 6 to be attached to the cleat 24.

In order to manipulate the boom to raised and lowered positions when desired, a pulley 26 is attached to the ring R in an opposite direction to the pulleys 17 and 20 and has passed therethrough, the cable 27 which is also connected to the pulley 28, constituting a tackle for the cable 27, so that by pulling upon the end adjacent to the cleat 29, the boom 6 may be raised, or the cable may be released to permit of the lowering of the boom.

When operating the present net, the tuck lines 21 are released, and the draw lines 13 are pulled upon so as to stretch the net to assume the position as shown in Fig. 1. With the parts in this position, the cable 27 is released so that the boom 7 is lowered lowering the net into the water to the bottom or the desired depth. In order to collapse the net, the winch 18 is operated to simultaneously release the draw lines 13 and pull upon the tuck lines 21, the lead line being drawn in toward the center as is the usual practice in drop nets. When it has been drawn sufficiently, the cable 27 is operated upon to elevate the boom so that the net is drawn above the surface and the boom is then swung to place the net above the boat 4. When the same is in that position, the trip lines 22 are quickly released and the fish are permitted to be dropped from the net.

It will thus be seen by providing the ring 11, that the present net will be easily extended by operating the draw lines 13 inasmuch as they pull outwardly relatively to the lead line 2 of the net, while the said ring may also constitute a means for assisting in the lowering of the net inasmuch as it is preferably made of metal.

What is claimed is:

1. In a device of this character, the combination of a drop net having a lead line, a tubular member attached to the end of the net remote from the lead line, a plurality of tuck lines connected to the lead line and extending through the tubular member, a metal ring disposed exteriorly of the net, and a plurality of draw lines guided by the ring and attached exteriorly to the lead line.

2. In a device of this character, the combination of a drop net having a lead line, a tubular member attached to the end of the net remote from the lead line, a plurality of tuck lines connected to the lead line and extending through the tubular member, a metal ring disposed exteriorly of the net, a plurality of draw lines guided by the ring and attached exteriorly to the lead line, a boom support, means connected to the boom support and to the ring for holding the ring relatively thereto, and a trip line attached to the tubular member for assisting in tripping and dumping the net.

3. In a device of this character, the combination with a mast, and a boom swingingly attached thereto, of a drop net, a lead line carried upon the lower edge thereof, a tubular member connected to the apex thereof, a plurality of tuck lines connected to the lead line upon the inside and extending through the tubular member, a single cable connected to the tuck lines, a plurality of guides carried by a ring disposed exteriorly of the net, a plurality of draw lines connected to the lead line exteriorly of the net and extending through the guides, and a single cable connected to the draw lines, said tuck lines and draw lines being connected to the boom for manipulating the net.

4. In a device of this character, the combination with a mast, and a boom swingingly attached thereto, of a drop net, a lead line carried upon the lower edge thereof, a tubular member connected to the apex thereof, a plurality of tuck lines connected to the lead line upon the inside and extending through the tubular member, a single cable connected to the tuck lines, a plurality of guides carried by a ring disposed exteriorly of the net, a plurality of draw lines connected to the lead line exteriorly of the net and extending through the guides, a single cable connected to the draw lines, means connected to the boom for raising and lowering the boom, and means for slidably connecting the draw line and tuck line cables to the boom.

5. In a device of this character, the combination with a mast, and a boom swingingly attached thereto, of a drop net, a lead line carried upon the lower edge thereof, a tubular member connected to the apex thereof, a plurality of tuck lines connected to the lead line upon the inside and extending through the tubular member, a single cable connected to the tuck lines, a plurality of guides carried by a ring disposed exteriorly of the net, a plurality of draw lines connected to the lead line exteriorly of the net and extending through the guides, a single cable connected to the draw lines, means connected to the boom for raising and lowering the boom, means for slidably connecting the draw line and tuck line cables to the boom, and a tuck line slidably connected to the boom and attached to the tubular member.

In testimony that I claim the foregoing as my own, I have hereto affixed my signature in the presence of two witnesses.

JOSEPH C. MORSE.

Witnesses:
CLARENCE C. McCORSLEY,
J. E. COOK.